(12) United States Patent
Houseley

(10) Patent No.: US 11,447,426 B2
(45) Date of Patent: Sep. 20, 2022

(54) FORMING EVAPORITE MINERAL PRODUCTS AND THEIR USE AS FERTILISER

(71) Applicant: York Potash Ltd, London (GB)

(72) Inventor: Karl Houseley, Consett (GB)

(73) Assignee: York Potash LTD, London (GB)

( * ) Notice: Subject to any disclaimer, the term of this patent is extended or adjusted under 35 U.S.C. 154(b) by 85 days.

(21) Appl. No.: 16/489,052

(22) PCT Filed: Feb. 27, 2018

(86) PCT No.: PCT/GB2018/050508
§ 371 (c)(1),
(2) Date: Aug. 27, 2019

(87) PCT Pub. No.: WO2018/154339
PCT Pub. Date: Aug. 30, 2018

(65) Prior Publication Data
US 2020/0062666 A1   Feb. 27, 2020

(30) Foreign Application Priority Data
Feb. 27, 2017 (GB) .................. 1703154

(51) Int. Cl.
| | |
|---|---|
| C05D 1/00 | (2006.01) |
| C05G 5/12 | (2020.01) |
| C01F 11/46 | (2006.01) |
| C01F 11/24 | (2006.01) |
| C01F 11/20 | (2006.01) |

(Continued)

(52) U.S. Cl.
CPC .............. C05D 1/005 (2013.01); B07B 7/00 (2013.01); C01F 11/24 (2013.01); C01F 11/46 (2013.01); C05D 5/00 (2013.01); C05D 9/00 (2013.01); C05G 5/12 (2020.02); B02C 23/22 (2013.01); C01P 2004/61 (2013.01); C01P 2006/10 (2013.01)

(58) Field of Classification Search
None
See application file for complete search history.

(56) References Cited

U.S. PATENT DOCUMENTS

| | | |
|---|---|---|
| 687,266 A | 11/1901 | Raymond |
| 1,946,068 A | 2/1934 | Friedrich |
| (Continued) | | |

FOREIGN PATENT DOCUMENTS

| | | |
|---|---|---|
| CN | 1485277 A | 3/2004 |
| CN | 102101068 A | 6/2011 |
| (Continued) | | |

OTHER PUBLICATIONS

Anonymous: "Project Summary Document—polyhalite project summary," May 31, 2016 (May 31, 2016), pp. 1-32, Web May 18, 2018.
(Continued)

*Primary Examiner* — Wayne A Langel
(74) *Attorney, Agent, or Firm* — Mintz, Levin, Cohn, Ferris, Glovsky and Popeo, P.C.

(57) ABSTRACT

A method for separating a particulate stream of an evaporite mineral feedstock, the method comprising passing the stream to an air classifier configured to separate the particulate stream into a fine component and a coarse component.

12 Claims, 2 Drawing Sheets

(51) Int. Cl.
   *C05D 5/00* (2006.01)
   *C05D 9/00* (2006.01)
   *B07B 7/00* (2006.01)
   B02C 23/22 (2006.01)

(56) References Cited

U.S. PATENT DOCUMENTS

| | | | | |
|---|---|---|---|---|
| 3,972,808 | A | * | 8/1976 | Manley ............... B07B 4/02 209/133 |
| 4,058,124 | A | | 11/1977 | Yen et al. |
| 4,213,852 | A | * | 7/1980 | Etkin ................ B07B 4/02 209/136 |
| 4,246,019 | A | | 1/1981 | Sokolov et al. |
| 5,100,063 | A | | 3/1992 | Bauer |
| 5,103,981 | A | * | 4/1992 | Abbott ............... A24B 1/04 209/139.1 |
| 5,301,812 | A | * | 4/1994 | Garrett .............. B07B 11/00 209/714 |
| 5,695,542 | A | | 12/1997 | Chang |
| 5,829,597 | A | * | 11/1998 | Bielagus ............ D21B 1/028 209/29 |
| 6,283,300 | B1 | * | 9/2001 | Bielagus ............ B07B 4/02 209/139.1 |
| 7,506,764 | B2 | * | 3/2009 | Couture ............. B07B 4/02 209/134 |
| 8,865,214 | B1 | | 10/2014 | Imam et al. |
| 9,550,703 | B2 | | 1/2017 | Forsythe et al. |
| 9,856,180 | B2 | | 1/2018 | Farnworth et al. |
| 2008/0029441 | A1 | * | 2/2008 | Deiseroth ........... B03C 7/006 209/163 |
| 2011/0113749 | A1 | * | 5/2011 | Couture ............. B07B 4/02 60/200.1 |
| 2011/0315607 | A1 | * | 12/2011 | Tanaka .............. B07B 7/083 209/154 |
| 2015/0053800 | A1 | | 2/2015 | Bourgeois |
| 2017/0096376 | A1 | * | 4/2017 | Farnworth ........... C05D 1/00 |
| 2017/0129822 | A1 | * | 5/2017 | Farnworth ........... B01J 2/14 |
| 2017/0137333 | A1 | * | 5/2017 | Farnworth ......... C05D 1/005 |
| 2017/0305805 | A1 | * | 10/2017 | Farnworth ........ B01F 13/1025 |
| 2019/0337864 | A1 | | 11/2019 | Asada et al. |

FOREIGN PATENT DOCUMENTS

| | | |
|---|---|---|
| CN | 204035036 U | 12/2014 |
| CN | 205731379 U | 11/2016 |
| CN | 206008824 U | 3/2017 |
| DE | 3915432 A1 | 11/1990 |
| DE | 4016262 C1 | 8/1991 |
| DE | 19700471 A1 | 7/1998 |
| EP | 3 201 160 A1 | 8/2017 |
| FR | 805785 A | 11/1936 |
| GB | 2522490 A | 7/2015 |
| GB | 2522491 A | 7/2015 |
| GB | 2522492 A | 7/2015 |
| GB | 2560025 A | 8/2018 |
| GB | 2560026 A | 8/2018 |
| GB | 2560027 A | 8/2018 |
| JP | H01284343 A | 11/1989 |
| JP | 2003175367 A | 6/2003 |
| NZ | 563529 A | 6/2009 |
| RU | 2004354 C1 | 12/1993 |
| SU | 608568 A1 | 5/1978 |
| WO | WO-2013/074328 A1 | 5/2013 |
| WO | WO-2014/064243 A1 | 5/2014 |
| WO | WO-2018/146684 A1 | 8/2018 |
| WO | WO-2018/154338 A1 | 8/2018 |
| WO | WO-2018/154339 A1 | 8/2018 |
| WO | WO-2018/154340 A1 | 8/2018 |

OTHER PUBLICATIONS

Database WPI, Accession No. 1994-116045, Week 199414, Thomas Scientific, London, GB; English language abstract of RU 2004354 C1. 1 page. Retrieved Aug. 17, 2017.
Database WPI, Accession No. 2004-562810, Week 200455, Thomas Scientific, London, GB; XP002781232. English language abstract of CN 1485277 A. 1 page.
GB Search Report issued in GB Application No. GB1703152.7, dated Aug. 7, 2017. 6 pages.
GB Search Report issued in GB Application No. GB1703154.3, dated Aug. 17, 2017. 4 pages.
GB Search Report issued in GB Application No. GB1703155.0, dated Aug. 29, 2017. 3 pages.
International Search Report and Written Opinion issued in International Application No. PCT/GB2018/050506 dated Jun. 7, 2018 (dated Jun. 7, 2018). 9 pages.
International Search Report and Written Opinion issued in International Application No. PCT/GB2018/050508 dated Jun. 6, 2018 (dated Jun. 6, 2018). 9 pages.
International Search Report and Written Opinion issued in International Application No. PCT/GB2018/050509 dated Jun. 7, 2018 (dated Jun. 7, 2018). 8 pages.

* cited by examiner

FORMING EVAPORITE MINERAL PRODUCTS AND THEIR USE AS FERTILISER

This application is the national stage filing under USC 371 of international application PCT/GB2018/050508, filed Feb. 27, 2018, which claims the benefit of GB Application No. 1703154.3, filed Feb. 27, 2017, all of which are hereby incorporated in their entirety and for all purposes.

BACKGROUND OF THE INVENTION

This invention relates to forming a powder of an evaporite mineral and to forming pelletised products, for example for use as fertiliser.

Polyhalite is an evaporite mineral. It is a complex hydrated sulphate of potassium, calcium and magnesium of general formula $K_2Ca_2Mg(SO_4)_4 \cdot 2H_2O$. Deposits of Polyhalite occur in, amongst other countries, Austria, China, Germany, India, Iran, Turkey, Ukraine, the UK and the USA.

Polyhalite has the capacity to be valuable as a source of agricultural fertiliser. In some prior art processes it has been proposed to decompose natural Polyhalite to extract specific nutrients. See, for example, WO 2013/074328, U.S. Pat. Nos. 1,946,068 and 4,246,019. However, intact Polyhalite is also usable as a fertiliser, being able to supply sulphur, potassium, calcium and magnesium to the soil.

Mineral Polyhalite can be spread in raw, crushed form. That minimises processing costs, but it has a number of disadvantages. Once applied to the soil the raw mineral takes some time to break down, delaying the bioavailability of its constituents. If applied in chipped form, the Polyhalite tends to be of irregular shape and size, meaning that there can be difficulties in applying it uniformly, and that it can be difficult to apply using some types of agricultural spreading machinery. Untreated powdered Polyhalite might in some circumstances be capable of being uniformly spread. However, since Polyhalite powder can be strongly hygroscopic its mechanical properties can vary quickly and radically over time once exposed to air; and again it can be difficult to spread evenly with some types of machinery.

It is known from to form Polyhalite-containing pellets for use as a fertiliser.

A number of problems arise in processing evaporate minerals such as Polyhalite into pellets. One is that it can be difficult to obtain a reliable pelletised product from evaporite feedstocks due to problems surrounding controlling the takeup of water by the evaporite mineral. This can result in uneven operation of the process.

Another difficulty has been found to arise from the problems surrounding binding of evaporite mineral powder into pellets, with binding being unreliable in some operational circumstances. It has been found that the binder and its method of application needs to be carefully selected in order to achieve good results.

One way to form pellets is to first form a powder of the evaporate mineral, and then to integrate the powder into pellets. Another difficulty has been found to arise from the problems surrounding converting the raw mineral into powder for pelletising, especially on an industrial scale. It would be possible to use a wide range of conventional powder-forming crushers such as cone crushers, attritor mills and ball mills in order to form the powder. However, the crushing process is highly energy intensive, especially when performed at very large scale. It would be desirable to identify a crushing process that uses relatively little energy. One factor that contributes to the energy usage is the extent to which material needs to be recycled through the crushing stage. A crushing process that generates a considerable proportion of powder on a single pass, and without a significant dwell time in the crushing stage, would be preferred.

A further significant factor is the mechanism for separating the output of the crushing stage by size, to ensure that larger pieces of mineral are excluded from the powder stream. One option would be to use a screen for this purpose, for example a rotating drum screen. This can achieve high levels of throughput in good conditions, but it can be relatively inefficient and the screen can become clogged, especially if the powder is damp.

A high pressure grinding roll (HPGR) machine comprises a pair of rollers which are disposed adjacent to each other, arranged on parallel axes. The rollers are spaced apart, defining a crushing channel between them. Material to be crushed is fed into the zone between the rollers. The rollers rotate in opposite directions so as to draw feedstock into the crushing channel. Crushed material is ejected from the downstream side of the crushing channel. The rollers may be formed of or coated with a particularly hard material so as to improve their effectiveness and/or lifetime. In typical applications, HPGR rollers have a lifetime of around 6000 hours.

Conventionally, HPGRs are not used for fine grinding. In a typical installation where powder is the desired output, HPGRs are used to form an intermediate product which is then subjected to ball milling or another form of processing. One reason for this is the difficulty of configuring an HPGR installation to generate powder with a typical feedstock. The rollers might have to be precisely set very close to each other, and this might be expected to result in a low level of throughput.

An air classifier comprises a chamber through which a stream of material feedstock passes from an inlet to a first outlet. Normally the inlet is located below the outlet so that the material passes to the outlet under the action of gravity. A draught of air blows across the stream of material, towards an second outlet, offset from the first outlet. Finer components of the stream are deflected by the draught and exit through the second outlet, whereas coarser components exit through the first outlet. To the knowledge of the applicant, air classifiers are not typically used for processing crushed ore.

There is a need for an efficient process for forming powder of an evaporate mineral such as Polyhalite, and for pelletising such a powder.

SUMMARY OF THE INVENTION

According to one aspect there is provided a method for separating a particulate stream of an evaporite mineral feedstock, the method comprising passing the stream to an air classifier configured to separate the particulate stream into a fine component and a coarse component.

Preferably at least 90% by mass of the fine component has a maximum diameter less than 400 µm or less than 250 µm. Preferably at least 90% by mass of the fine component has a maximum diameter greater than 150 µm or greater than 180 µm.

The evaporite mineral may be one of Anhydrite, Carnalite, Gypsum, Halite, Kainite, Kieserite, Langbeinite, Sylvite and Polyhalite.

The evaporite mineral may be Polyhalite.

The density of the evaporite mineral may be in the range from 2.6 to 3.0 g/cm$^3$, more preferably in the range from 2.7 to 2.9 g/cm$^3$.

The method may comprise comprising pelletising at least part of the fine component.

The method may comprise spreading pellets formed in the said pelletising step as a fertiliser.

BRIEF DESCRIPTION OF THE DRAWINGS

The present invention will now be described by way of example with reference to the accompanying drawings.

In the drawings.

DETAILED DESCRIPTION

Figure 1:
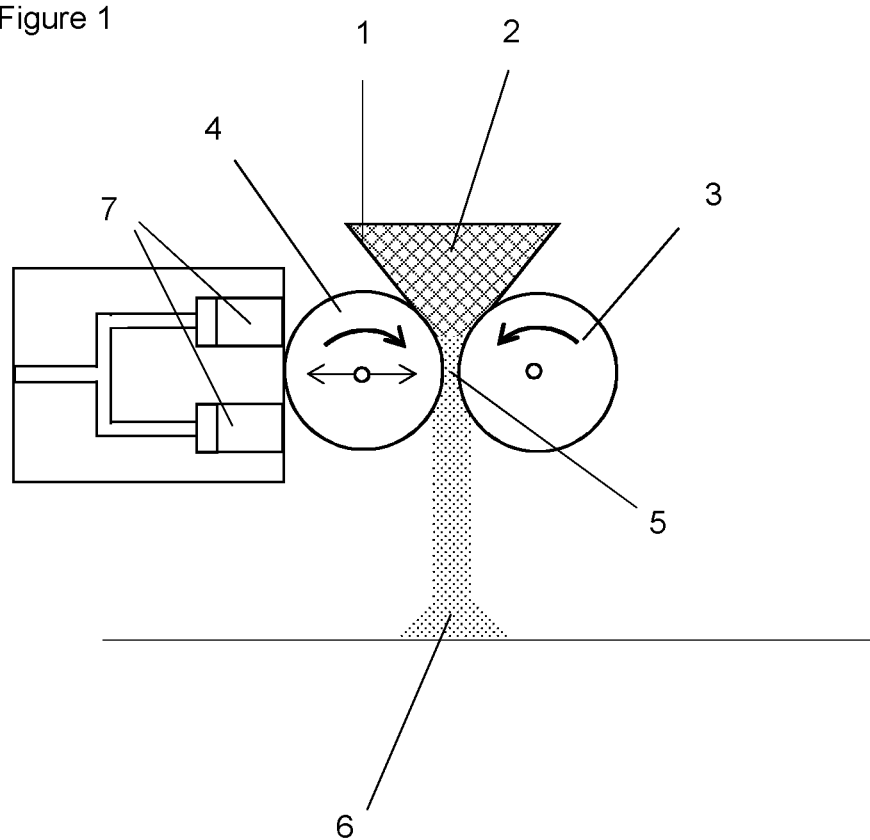
FIG. 1 shows a diagram of a high pressure grinding roll (HPGR) system.

As indicated above, Polyhalite is a complex hydrated sulphate of potassium, calcium and magnesium of general formula $K_2Ca_2Mg(SO_4)_4 \cdot 2H_2O$. Naturally occurring Polyhalite may of course vary a little from that general composition. Polyhalite has a Moh's hardness of around 2.5 to 3.5.

It may be desired to form the Polyhalite into a spreadable fertiliser product. One way in which this can be done will now be described.

Ore Extraction

Raw Polyhalite ore is extracted by mining. The raw Polyhalite may be in the form of irregular blocks, boulders or cobbles or in another form.

Initial Crushing

The raw Polyhalite is processed to render it generally into elements of a uniform size. This will be referred to below as an intermediate size. Reducing the raw Polyhalite to an intermediate size can help in transporting or subsequent processing of the ore. For example, irregular blocks of Polyhalite extracted from the mine can be crushed so that substantially no pieces having a dimension greater than a predetermined size remain. That predetermined size may, for example be 150 mm or thereabouts (i.e. a size of minus 150 mm).

In this form the Polyhalite can be stored in a bin, warehouse or other receptacle, or in a heap, until it can be processed further. Preferably, if the Polyhalite is to be stored for any significant length of time it is stored in an enclosed container. This can help to reduce absorption of water by the Polyhalite. By storing the Polyhalite such that at least 50% or at least 70% by volume of the Polyhalite is in the form of blocks having a smallest dimension of, e.g., 80 mm or 100 mm, the Polyhalite can be protected from absorbing excessive water from the atmosphere.

In general, it is preferred that after having been chipped the Polyhalite is stored in a substantially airtight container, such as a closed bag formed of impermeable sheet, so that its ability to absorb moisture from the atmosphere is restricted. Another way to achieve a similar result is to pass the chipped Polyhalite to the next stage of the process within a limited period of time, for example in less than 6, 12 or 24 hours after initial crushing/chipping, In general, since the crushing process may produces a range of sizes, the product at this stage can range in size from powder up to a maximum dimension of, e.g., 100 mm, 150 mm or 200 mm, or may have an average dimension not greater than those values.

The initial crushing phase can be performed using one or more jaw crushers, impact crushers, cone crushers or any other suitable machinery.

Secondary Crushing

To form Polyhalite pellets, the intermediate-sized Polyhalite is rendered down to a suitable powder. This may be done in several stages.

In a first stage, the intermediate-sized Polyhalite is rendered down to a gravel-like size: for example to minus 20 mm or thereabouts. Taking the intermediate-sized Polyhalite as a starting point, this can be done by a first crushing step in which a feed of the intermediate-sized Polyhalite is crushed to a maximum size greater than the desired gravel-like size, for example to minus 50 mm or thereabouts. Some of the output of that crushing step will already be within the desired gravel-like size range (e.g. less than 20 mm). The output of the first crushing step can be screened to separate components within the desired gravel-like size range from the coarser components. The coarser components can then be directed to a second crushing step in which they are crushed to the desired gravel-like size range, or re-cycled through the preceding crusher. The in-size output of the second crushing step is recombined with the fine fraction from the screening step.

The gravel-like Polyhalite may have substantially no pieces having a dimension greater than, e.g., 10 mm, 15 mm, 20 mm, 25 mm or 30 mm. A proportion such as 70%, 80% or 90% by mass of the gravel-like Polyhalite may have a size greater than 200 µm. The secondary crushing phase can be performed using one or more impact crushers, cone crushers or any other suitable machinery.

Powdering

The gravel-like Polyhalite is rendered down to a powder. This can be done using any suitable crushing technology. However, it has been found that it is particularly efficient to perform this step using high pressure grinding rolls.

FIG. 1 shows n HPGR grinding machine. HPGRs utilize two counter-rotating rolls in order to crush a feedstock. As shown in FIG. 1, a feed hopper 1 can direct the feedstock 2 into a crushing zone 5 between two rolls 3 and 4. The rotation axis of one of the rolls may be fixed, while the rotation axis of the other may be floating or adjustable. Alternatively, the axes of both grinding rolls may be adjustable. Hydraulic cylinders 7 can apply very high pressure to the system, causing inter-particle comminution as the feed travels between the two rolls. Alternatively, hydro-pneumatic springs may be used to apply force to the adjustable roll(s). The rotational speed of the rolls may be adjusted to obtain optimum grinding conditions. The press force and roller speed can be controlled and adjusted as required during operation.

In the present system, an HPGR grinding machine is configured so as to receive the gravel-like Polyhalite and to crush it to a powder. This has been found to be a highly efficient way of processing Polyhalite. First, it has been found to consume less energy than other crushing techniques for rendering Polyhalite to powder. There is a surprisingly high level of size diminution when Polyhalite is passed through the HPGR machinery. Second, whereas in typical applications HPGR rollers may have a lifetime of around 6000 hours, experiments indicate that in the present application a lifetime of 4 to 5 years can be expected. Without wishing to be bound by theory, it is believed that there are several reasons for these observations. First, Polyhalite has a particularly brittle fracture mechanism. Polyhalite belongs to the triclinic crystal system, with space group P$\bar{1}$ (triclinic pinacoidal). Polyhalite cleaves well on the {10$\bar{1}$} crystallographic planes. This cleavage is due to weak cohesive forces and related to the crystal structure of the mineral. This results in smooth surfaces along the cleavage planes. Polyhalite also undergoes polysynthetic twinning on the {010} and {100} planes. Parting (pseudo cleavage), which occurs in minerals that are crystallographically twinned, or which have been stressed by pressure, occurs in Polyhalite on at least the {010} planes. When the Polyhalite breaks in directions other than the cleavage or parting planes, it undergoes conchoidal fracture. Therefore, Polyhalite is able to fracture in a number of crystallographic directions when subjected to high compressive forces and hence produces a fine output efficiently during the HPGR process.

It is believed that this makes Polyhalite especially suitable for powdering by a compressive, low-impact technique. It is believed that when a piece of the gravel-like Polyhalite is compressed between the high pressure grinding rollers, rather than simply cleaving in two, it is readily fragmented resulting in many small fragments. This may avoid any need to configure the rollers with an especially small gap between them, as might be needed to render other ores to a powder. A gap of such a small size might be difficult to control in a large-scale operational plant. Second, as an evaporate mineral, Polyhalite typically contains a relatively low level of relatively hard contaminants such as quartz or silica. This avoids wear on the HPGR machinery, even during fine crushing.

The HPGR machine may be configured such that when the input to the HPGR machine is 60% or more or 75% or more by mass of Polyhalite particles of size greater than 10 mm or 15 mm in dimension, 40% or more, 50% or more, 60% or more or 70% or more of the output of the HPGR machine has a largest dimension less than around 200 μm: for example less than 100 μm, 150 μm, 200 μm, 250 μm or 300 μm.

The rollers 3 and 4 may be fabricated from forged, heat treated alloy steel or another metallic or ceramic material. The rollers' exterior surfaces may be sleeved. The rollers' exteriors may be provided with tungsten carbide inserts, or inserts made from another wear-resistant material, to reduce erosion of the rollers. The edges of the rollers may also incorporate sections made of tungsten carbide or another wear resistant material to improve the protection of that portion of the rolls.

Fractioning the Output of the Powdering Step

The output of the HPGR machinery is divided into a fine and coarse fraction. The coarse fraction is returned to the HPGR machinery. The fine fraction is passed to the next stage of the process.

The coarse and fine fractions may be separated by screening or any other suitable process. However, it has been found that it is particularly efficient to perform this step using an air classifier.

The output of the HPGR stage is passed to the input of an air classifier. The air classifier is configured to separate a coarse fraction (greater in size than a predetermined dimension) from a fine fraction (smaller than that dimension). In the present case, that dimension may, for example, be around 200 μm: for example 100 μm, 150 μm, 200 μm, 250 μm or 300 μm. Preferably that dimension is 200 μm or more. The efficiency of an air classifier in any particular application can depend on the density of the material in question, the uniformity of the material in question, the cut-off between the desired coarse and fine fractions and the size distribution of the feedstock. It has been found that the use of an air classifier for classifying Polyhalite is especially efficient, and in particular when applied to the size distribution output from an HPGR machine configured as described above. One reason for this is believed to be the relatively low density of Polyhalite compared to typical other ores. (The density of Polyhalite is around 2.78 g/cm$^3$).

Pelletising

The Polyhalite powder representing the fine fraction of the output from the powdering stage is used as an input to the pelletising step. The powder may be such that 90% or 95% or more by mass of the powder meets a defined size limit. That limit may be such that the largest dimension is not greater than, for example 100 μm, 150 μm, 200 μm, 250 μm or 300 μm. A preferred size for the powder is minus 200 μm.

The Polyhalite powder is mixed with pre-cooked or pre-gelled starch which is to act as a binder. The starch is preferably substantially fully hydrated at the point of adding to the Polyhalite. The Polyhalite/starch mixture is then heated to stabilise the mixture. The mixture is then pelletised, for example by using a pan pelletiser as described in GB 2 522 491.

The proportion of starch to Polyhalite is selected so that the resulting pellets are sufficiently stable for use, whilst preferably maximising the proportion of Polyhalite in the pellets. It has been found that around 1% of starch to 99% of Polyhalite by mass provides good results.

To assist the integration of the Polyhalite and the starch binder, water and/or steam can be added to the mixture. In one approach the Polyhalite powder can be added to an aqueous starch material. In another approach the Polyhalite powder and starch can be mixed initially without addition of water, and then steam can be added to the mixture to simultaneously heat and hydrate the mixture.

The starch may be added to the Polyhalite in a substantially fully-hydrated, partially-hydrated or substantially unhydrated form. If the starch is not fully hydrated when it is added to the polyhalite then water may be added to the mixture to permit the starch to become fully hydrated before pelletisiing. Steam may be added to the starch, in the presence or absence of polyhalite, in order to gel the starch.

The Polyhalite/starch mixture can be heated in the presence of water to help the binding action. For example the mixture can be heated to a temperature greater than 60° C. or greater than 70° C., preferably to a maximum temperature not exceeding 80° C. During pelletisation the resulting pellets are dried to harden them. To reduce the energy required for the drying step, it is preferred to add as little water as will permit an acceptable product to result.

Preferably, dry Polyhalite powder is mixed with an aqueous solution or suspension of pre-cooked/pre-gelled starch. This has been found to permit efficient mixing of the Polyhalite powder and the starch. The dry Polyhalite powder may contain less than 10% or less than 5% or less than 2% water by mass (e.g. absorbed water). The proportion of Polyhalite to starch may be in the range from 95:5 to 99.5:0.5 by mass, more preferably in the range from 98:2 to 99.3:0.7 by mass, more preferably in the range from 98.5:1.5 to 99.3:0.7 by mass.

As indicated above, any pellets that are out of the desired size range can be reground (if oversize) or returned to the pan pelletiser (if undersize). It has been found that by using the steps described above, an in-specification yield of 85-90% by weight of the output from the pelletiser. By contrast, typical in-specification yields of limestone pelletising processes might be around 10%, the remaining 90% having to be recirculated.

The output of the pelletiser is wet, substantially spherical pellets. These are conveniently dried before packaging. To achieve this the pellets that have been output from the pelletiser can be passed to a drier. It has been found that a retention time of around 3 minutes in a drier capable of heating the pellets to a temperature of around 150° C. is sufficient to adequately dry the pellets. Moisture can be extracted from the dryer using a reverse jet air filter. The operating temperature and retention time in the dryer can be selected to provide pellets of the desired strength for subsequent handling.

Finally the pellets can be cooled and packaged, for example in 600 kg bags or 25 kg sacks, or shipped loose for use or further processing elsewhere.

Figure 2:
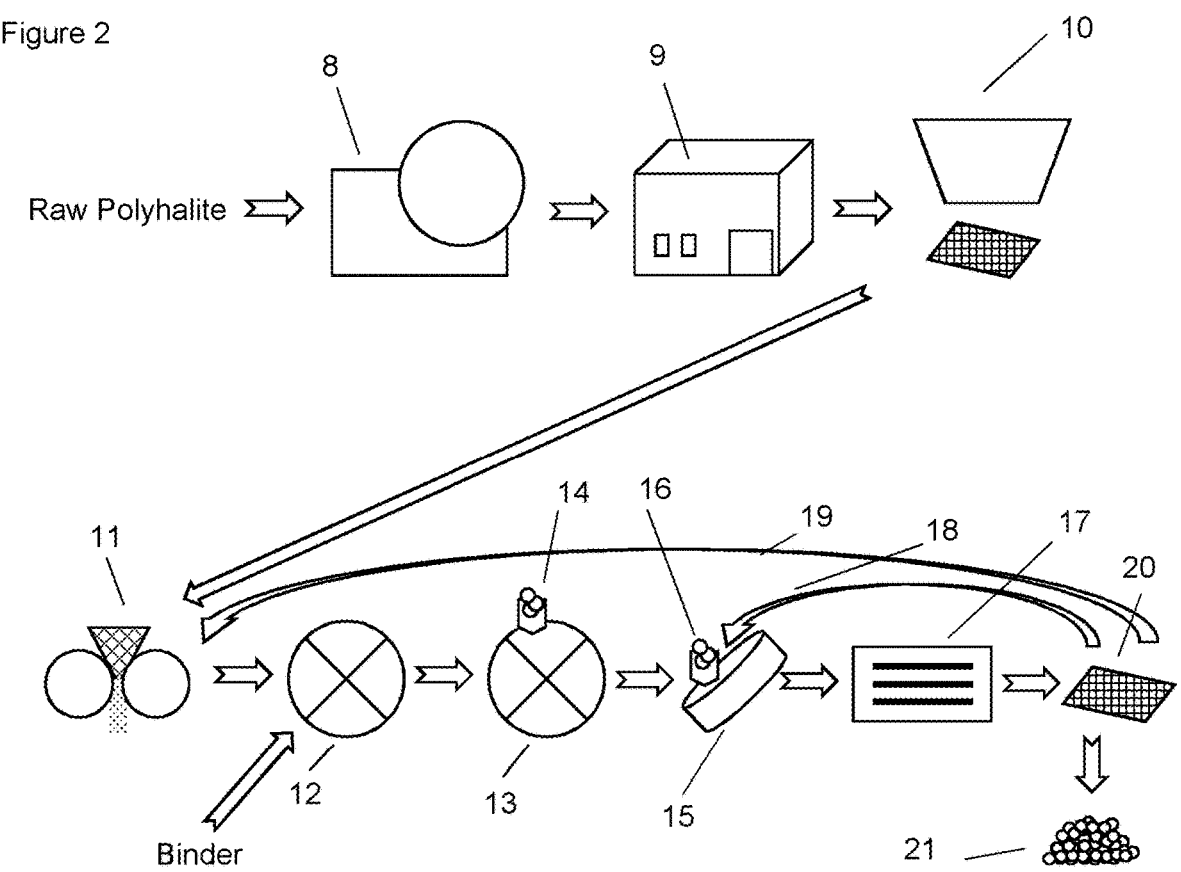
FIG. 2 shows a generalised overview of a pelletising process.

FIG. 2 shows a generalised overview of the complete process described above. As-mined raw Polyhalite is primary crushed in a jaw crusher 8 to produce a chipped Polyhalite product with an average diameter of less than approximately 150 mm. The chipped Polyhalite may be stored, e.g. in a warehouse 9, until shortly before it is to be processed by the subsequent steps.

At 10, the Polyhalite chips are then crushed further and screened to result in a chipped product with an average diameter of less than approximately 20 mm.

The chipped Polyhalite, with an average chip diameter of less than 20 mm, is then passed to the high pressure grinding rolls 11 where it is rendered to a powder.

The output of the HPGR 11 is passed to an air classifier 12. Coarse components are returned to the HPGR. Fine Polyhalite powder is passed to a mixer 13. The mixer 13 may be a pin mixer.

The Polyhalite powder is combined with water and starch (14) and mixed in mixer 13. The output of the mixer is a granulate product. The granulate product is applied to a pan pelletiser 15, to which additional water may be added as illustrated at 16. The pan pelletiser causes the granules to aggregate into substantially spherical pellets, which gradually exit the pelletiser. The exiting pellets are dried in a drier 17 and then sized by a set of screens 20. Undersize pellets are returned to the pelletiser as indicated at 18. Oversize pellets are returned to the HPGR as indicated at 19. The final product at 21 consists of pellets of substantially spherical form and within the size limits defined by the screens 20. Those pellets can then be packaged and supplied for agricultural use. Finally they can be spread on a field or other agricultural or horticultural substrate to act as a fertiliser.

Conveyor belts, auger conveyors or other handling apparatus can be used to move the components between processing stations.

Other additives may be included in the pellets. Such additives may one or more of the following, in any combination:

- a component having the effect of chemically and/or mechanically stabilising and/or preserving the pellets: for example to increase their shelf life, reduce their susceptibility to environmental contaminants or to reduce the likelihood of them being broken up during spreading;
- a component having the effect of enhancing the fertilising effect of the Polyhalite: for example by accelerating or retarding the breakdown of the Polyhalite in the field;
- a component having the effect of protecting or enhancing the growth of crops by means other than fertilising: for example a herbicide, fungicide, insecticide, rodenticide, hormone, plant stimulant or mycorrhizal fungus or spore;
- a seed: which may be a seed of an angiosperm and/or of a crop species (e.g. a cereal such as wheat, maize, rice, millet, barley, oats or rye);
- a further fertiliser composition in addition to the Polyhalite: for example a source of nitrogen and/or phosphorus;
- a pigment;
- a component having the effect of altering soil pH: for example lime, sulphur or a sulphate.

Such a component may be added at various stages in the process, for example it could be combined with the Polyhalite powder prior to or during the mixing stage as described above, or with the binder prior to that mixing stage, or with the Polyhalite/binder mix between the mixing stage as described above and the pelletising step, or it could be added to the pan pelletiser, or it could be sprayed or otherwise coated on to the pellets before or after drying.

The Polyhalite content of the resulting pellets is preferably greater than 75% by weight, more preferably greater than 80% and most preferably greater than 90%. In the case of pellets that contain seeds this may optionally be varied such that the Polyhalite content of the pellets excluding the weight of the seeds may be greater than 75% by weight, more preferably 80%, most preferably greater than 90%.

The pellets are preferably substantially spherical, and of substantially uniform volume and mass. The pellets may have a mean Wadell sphericity of greater than 0.85, 0.90 or 0.95. The pellets are preferably substantially free from voids, for example having not more than 1%, 2% or 5% by volume of air.

The process as described above may be used for pelletising minerals other than Polyhalite, and in particular for pelletising feedstocks composed principally of one or more evaporite minerals, especially other chloride minerals. These may include any one or more of Anyhdrite, Carnalite, Gypsum, Halite, Kainite, Kieserite, Langbeinite and/or Sylvite.

The process is especially suitable for pelletising feedstocks composed principally of minerals that are substantially hygroscopic in recently powdered form and/or that have a Moh's hardness in the range from 2 to 4. The resulting pellets may be used for purposes other than fertilisation.

The final pellets can be of any suitable size. A convenient format is for the pellets to be generally spherical, with a median diameter in the range from 4 mm to 10 mm.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for separating a particulate stream of an evaporite mineral feedstock, the method comprising passing the stream to an air classifier configured to separate the particulate stream into a fine component and a coarse component; and pelletising at least part of the fine component.

2. A method as claimed in claim 1, wherein at least 90% by mass of the fine component has a maximum diameter less than 400 μm.

3. A method as claimed in claim 2, wherein at least 90% by mass of the fine component has a maximum diameter less than 250 μm.

4. A method as claimed in claim 1, wherein at least 90% by mass of the coarse component has a minimum diameter greater than 150 μm.

5. A method as claimed in claim 1, wherein at least 90% by mass of the fine component has a minimum diameter greater than 180 μm.

6. A method as claimed in claim 1, wherein the evaporite mineral is Anyhdrite, Carnalite, Gypsum, Halite, Kainite, Kieserite, Langbeinite, Sylvite, or Polyhalite.

7. A method as claimed in claim 1, wherein the evaporite mineral is Polyhalite.

8. A method as claimed in claim 1, wherein the density of the evaporite mineral is in the range from 2.6 to 3.0 g/cm$^3$.

9. A method as claimed in claim 1, comprising spreading pellets formed in the said pelletising step as a fertiliser.

10. The method as claimed in claim 1, comprising crushing the coarse component to form a further particulate stream that is passed to further separation.

11. A method for separating a particulate stream of an evaporite mineral feedstock, the method comprising passing the stream to an air classifier configured to separate the particulate stream into a fine component and a coarse component; wherein at least 90% by mass of the fine component has a maximum diameter less than 400 μm, the evaporite mineral is polyhalite, and the density of the evaporite mineral is in the range from 2.6 g/cm$^3$ to 3.0 g/cm$^3$.

12. The method as claimed in claim 11, comprising pelletising at least part of the fine component.

* * * * *